United States Patent [19]
Bernhardt

[11] Patent Number: 5,095,975
[45] Date of Patent: Mar. 17, 1992

[54] ARRANGEMENT FOR DRIVING VOLATILE IMPURITIES FROM GROUND WATER

[75] Inventor: Bruno Bernhardt, Reutlingen, Fed. Rep. of Germany

[73] Assignee: IEG Industrie-Engineering GmbH, Betzingen, Fed. Rep. of Germany

[21] Appl. No.: 581,746

[22] Filed: Sep. 13, 1990

[30] Foreign Application Priority Data

Sep. 16, 1989 [DE] Fed. Rep. of Germany ....... 3931013
Jan. 16, 1990 [DE] Fed. Rep. of Germany ....... 4001011

[51] Int. Cl.$^5$ .............................................. E21B 43/00
[52] U.S. Cl. .................................. 166/67; 166/105.5; 166/106; 166/265; 166/370
[58] Field of Search .................. 166/265, 369, 370, 69, 166/74, 67, 117, 267, 313, 311, 312, 106, 105.5

[56] References Cited

U.S. PATENT DOCUMENTS

| | | | |
|---|---|---|---|
| 2,986,215 | 5/1961 | Barr | 166/67 |
| 3,945,436 | 3/1976 | Nebolsine | 166/312 X |
| 4,131,161 | 12/1978 | Lacquement | 166/265 |
| 4,531,593 | 7/1985 | Elliott et al. | 166/370 X |
| 4,766,957 | 8/1988 | McIntyre | 166/265 |

FOREIGN PATENT DOCUMENTS

| | | | |
|---|---|---|---|
| 242248 | 1/1987 | Fed. Rep. of Germany | 166/369 |
| 878907 | 11/1981 | U.S.S.R. | 166/106 |

Primary Examiner—Hoang C. Dang
Attorney, Agent, or Firm—Michael J. Striker

[57] ABSTRACT

An arrangement drives volatile impurities from ground water and ground through which it flows by producing a negative pressure in a well shaft extending to a region of a contaminated ground water by supplying a gas in an air chamber arranged above a water level in the well shaft. The arrangement includes partitions separating a well shaft region with a water permeable shaft wall for water suction from the ground and a well shaft region for resupply of the water into the ground. The partitions are formed as a pipe. A suction pump is arranged in the water suction region of the shaft and has an outlet, and a closed water receiving chamber is arranged underneath a nozzle body. The outlet of the suction pipe is connected with the water receiving chamber.

15 Claims, 2 Drawing Sheets

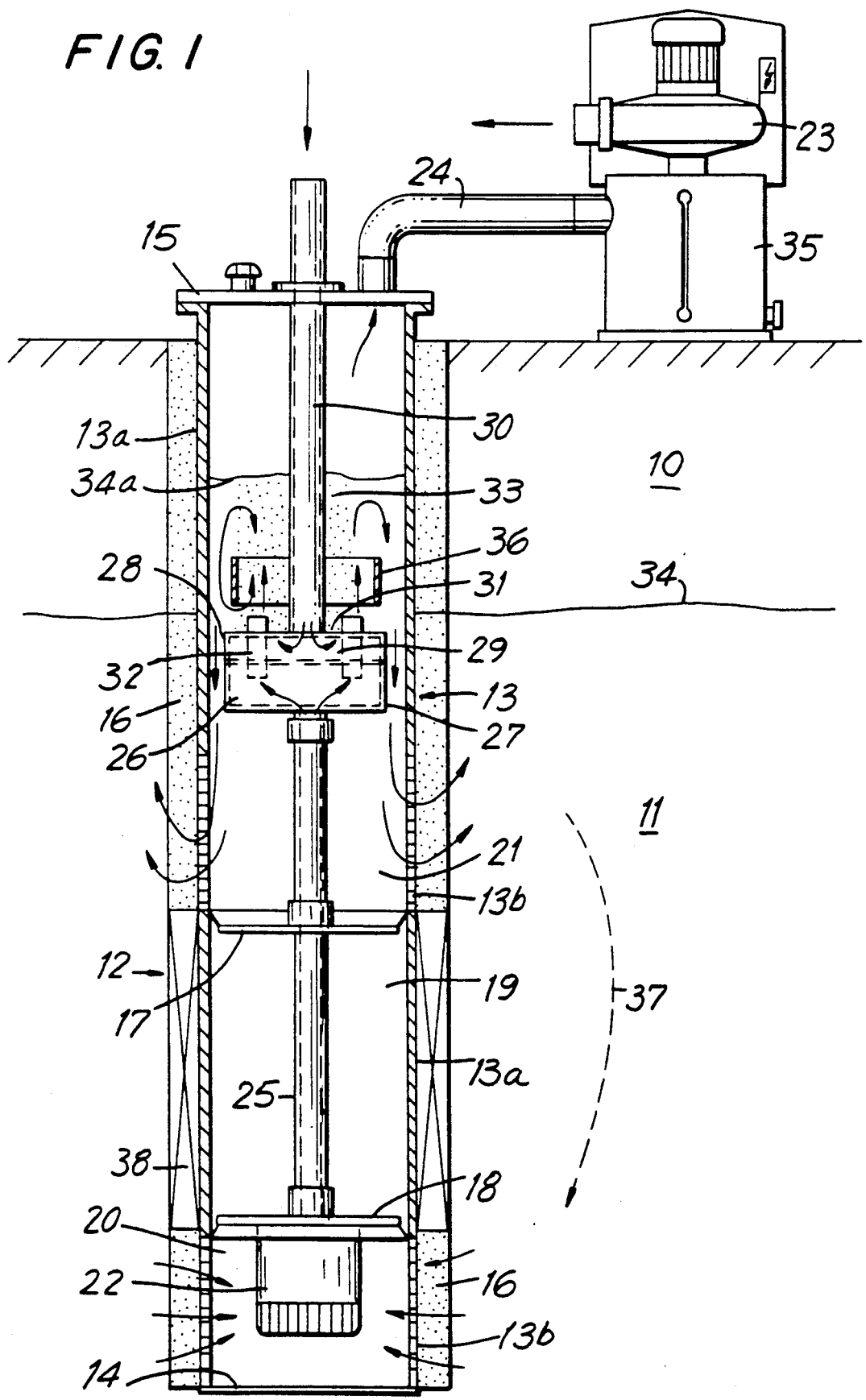

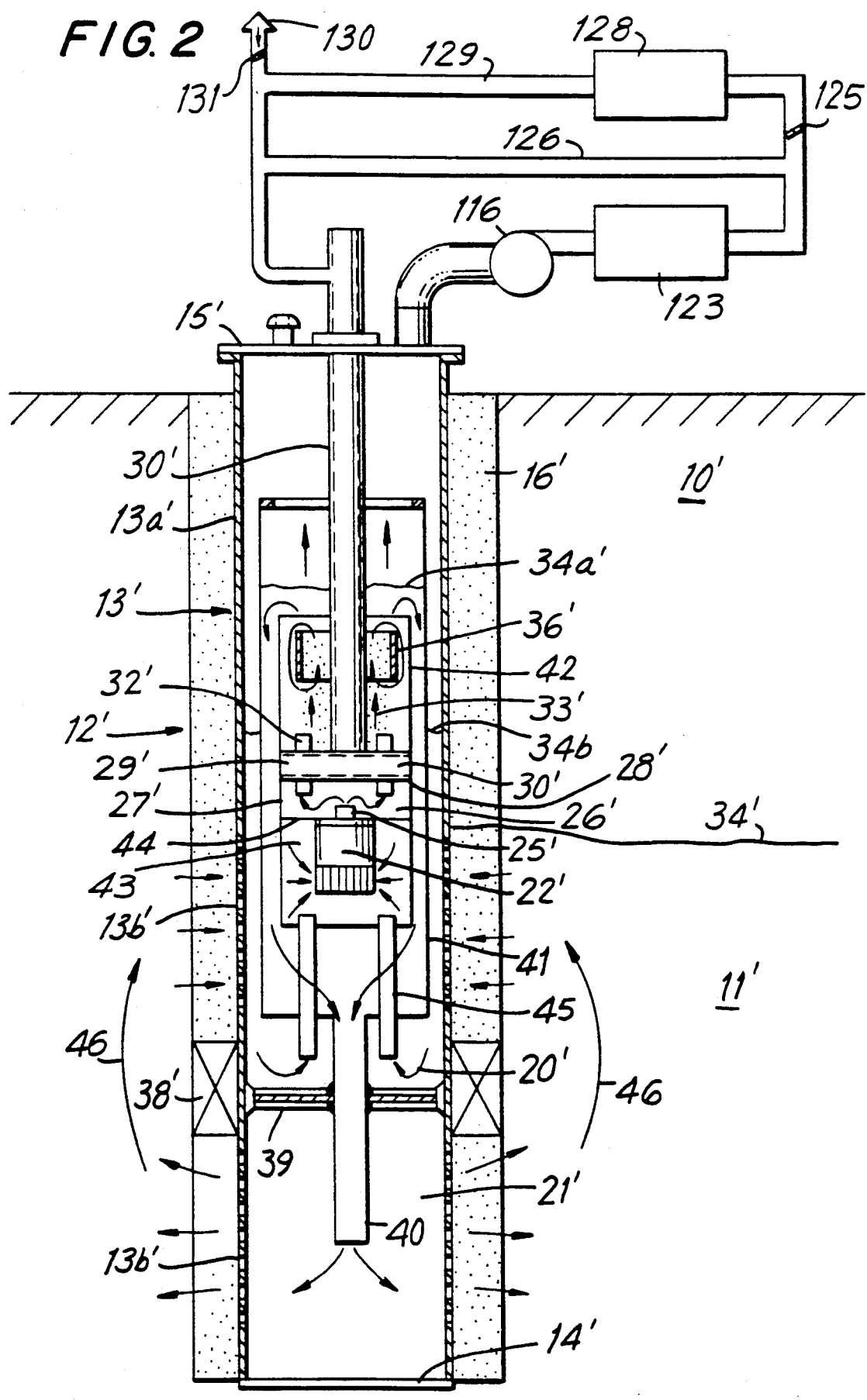

5,095,975

ARRANGEMENT FOR DRIVING VOLATILE IMPURITIES FROM GROUND WATER

BACKGROUND OF THE INVENTION

The present invention relates to an arrangement for driving volatile impurities from ground water and ground through which it passes.

More particularly, it relates to an arrangement of the above mentioned type in which the volatile components are driven by producing a negative pressure in a well shaft extending in the region of the contaminated ground water and by supplying a gas, especially fresh air, into an air chamber limited by a nozzle body located above the water level in the well, with separate sealed well shaft regions with water permeable shaft wall for water suction from the ground and for resupplying the water into the ground, wherein a pipe extends through the separating wall.

Arrangements of the above mentioned general type are known in the art. One such arrangement is disclosed for example in the German document DE-PS 3,811,962. This arrangement can be further improved in improving a ground water vertical flow in the well shaft.

SUMMARY OF THE INVENTION

Accordingly, it is an object of the present invention to provide an arrangement of the above mentioned general type for ground water cleaning, which is formed so that a regulatable vertical flow of the ground water is obtained.

In keeping with these objects and with others which will become apparent hereinafter, one feature of the present invention resides, briefly stated, in an arrangement in which a suction pump is arranged in the water suction region of the shaft and its outlet is connected through a pipe with a closed water receiving chamber located under the nozzle body.

The additional pump of the shaft reinforces the suction action of the negative pressure produced by the pump arranged outside of the shaft. It can supply further water quantities first into a water receiving chamber under the nozzle body and then through its openings into the cleaning region above the nozzle body. Therefore, the water level in the well shaft is lifted. Pressure increase actuated by the higher water column contributes to the vertical flow of the purified water in the shaft from above downwardly and facilitates the water supply of the water into the ground. This is advantageous especially in the case of dense ground layers. The suction output of the pump can be controlled and regulated by a control unit connected with the pump. Therefore the arrangement is easily adjustable to different ground conditions and different shaft diameters.

By the arrangement of the suction and resupply regions in a common well shaft and their separation by a partition, the generation of a water circulation between the ground and the cleaning device in the well shaft is possible. The water flows through the suction part into the shaft and leaves the same after cleaning through the resupplied part arranged at different depths than the suction part in the shaft. Suction and resupply is performed in different ground layers. Therefore, not only a vertical flow of water in the shaft is produced, but also in the ground around the well shaft. This prevents a horizontal spreading of the contaminant substances through the spread purified ground water.

Due to the arrangement of the suction region over the resupply region in the valve shaft, a water circulation through the shaft and the ground can be performed in counter-clockwise direction, and in opposite case a water circulation can be performed in clockwise direction. The suction and resupply region of the shaft can be arranged in significantly different depths in the shaft. Therefore advantageously a water free chamber can be provided between both regions and sealed by separation walls. This chamber is arbitrarily expandable so that ground layers of different depths can be reached by the cleaning device.

Advantageously, a sealing pack is arranged around the shaft wall in the region between the suction and resupply regions of the shaft. This prevents that the purified ground water supplied in the ground will flow along the shaft wall directly, without flowing into the ground to the suction parts.

The vertical guidance of the ground water in the well shaft can be increased when the water receiving chamber for the suction pump, the nozzle body and the cleaning region arranged over it are located in a cup shaped extension of the connecting pipe between the suction and resupply region in the shaft. The space between the concentric walls of the cup shaped pipe extension and the shaft serve as guide for the ground water flowing downwardly from the cleaning region to the resupply parts. In the cleaning arrangement with the suction region located above the resupply region, the suction pump can be arranged in the above mentioned cup-shaped extension of the connecting pipe.

Since the vertical flow both in the well shaft and in the surrounding ground is improved and the intensity of the flow is regulatable, the arrangement is especially suitable for dense or very thin ground water-guiding ground layers.

The cleaning action of the arrangement and its efficiency can be additionally increased when the devices for suction of the cleaning gas or gas mixture and the suction devices are followed by filter devices. The filter device can have at least one connection to a supply passage for the cleaning gas or gas mixture for at least partial return of the gas into the well shaft.

The at least partial return of the filtered gas into the well shaft allows a frequent re-use of the gas for cleaning of the contaminated ground water. Thereby, the permanent supply of fresh and expensive special gas for cleaning is no longer needed. With the use of air for cleaning, which can be aspirated in a simple and inexpensive way from above the earth surface, the return of the filtered waste air is advantageous since undesirable oxidation in the ground water-guiding ground layers can be avoided.

The filter device for cleaning the waste air or contaminated cleaning gas can be formed as a multi-stage device. The first filter stage can be used for coarse filtering and further stages can be used for fine filtering of gas or gas mixture. In the multi-stage arrangement the filtering action is substantially higher than in a single stage arrangement. The arrangement provides a connection to the supply passage of the cleaning gas into the shaft after the first filter stage. The portion of the gas supplied through the connection is adjustable by a throttle flap, so that with only small contamination of the ground water an insignificant fine filtering of the cleaning gas by the subsequent stages can be avoided.

The filtering expenses are thus adjustable to the degree of contamination. Therefore, the time and the cost for filtration of the waste air or the waste gas can be controlled.

For fine filtering, a cold reactor can be provided in a subsequent stage located after the first stage, for freezing the impurities. The freezing of impurities provides for a cost favorable and very efficient filtering process.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view schematically showing a longitudinal section of the arrangement for driving out volatile impurities from ground water in accordance with a first embodiment of the present invention;

FIG. 2 is a view schematically showing a longitudinal section of the inventive arrangement in accordance with a second embodiment of the invention.

DESCRIPTION OF THE PREFERRED EMBODIMENTS

FIG. 1 shows a well shaft 12 arranged in the ground 10 up to a region 11 with contaminated ground water. A well pipe 13 with water-impermeable wall regions 13a and water permeable water regions 13b is located in the well shaft 12. The well pipe 13 is closed by a bottom 14 and a cover 15. The hollow chamber between the well pipe 13 and the well shaft 12 is filled with filter gravel 16. The interior of the well pipe 13 is separated by two partitions 17 and 18 enclosing a water free chamber 19. The chamber 19 separates a water suction region 20 of the shaft with the perforated wall 13b from a resupply region 21 of the shaft with the water permeable walls 13b.

A suction pump 22 is arranged in the suction region 20 and reinforces the suction action of a pump 23 which is located above the earth surface and connected through a suction pipe 24 with the well shaft 12. Thereby it reinforces the negative pressure produced in the well shaft 12. The water sucked by the pump 22 is supplied via a connecting pipe 25 through the water free shaft region 19 and the resupply region 21 into a water receiving chamber 26. The water receiving chamber 26 is closed from below by a cup-shaped housing 27 and from above by a nozzle body 28.

The nozzle body 28 is also of a cup-shaped design and limits a air receiving chamber 29. Air is supplied from outside through a supply pipe 30 into the air receiving chamber 29 depending on the negative pressure acting in the shaft. The nozzle body 28 in its upper limit plate has fine openings 31 and water passage shafts 32. Air which is collected in the air receiving chamber 29 rises through the fine openings 31 in form of fine bubbles into a cleaning region 33 of the shaft. The water passage shaft 32 serve for applying the aspirated ground water from the water receiving chamber 26 into the cleaning region 33, in which air bubbles pass through it. The air bubbles bind with contaminants in the water and transport them outwardly of the water. The air and the contaminant substances are aspirated above the water level 34a in the well shaft 12 by the pump 23 through the suction pipe 24 and supplied through a condensate separator 35 before discharging to outer space.

Under the action of both pumps 22 and 23, the water level in the well shaft is lifted to a level 34a relative to the level 34 in the surrounding ground 10. The water pressure caused by this lifting leads to a vertical flow of the purified ground water from the cleaning region 33 downwardly to the resupply region 21 of the well shaft 12. A guiding ring 36 which is arranged concentrically relative to the supply pipe 30 contributes to the guidance of the vertical flow through the space which is limited from inside by the guiding ring 36, the nozzle body 28, the housing 27 of the water receiving chamber 26 and from outside by the tubular wall 13a. Finally, the purified ground water is discharged through the perforated tubular wall 13b into the ground water layer 11.

Due to the spatially separated arrangement of the suction region 20 and the resupply region 21, a vertical flow is formed outside of the shaft in a weak fashion, as identified with the broken arrow 37. A spreading of the contaminants to the regions located farther from the well shaft is not to be feared in the case of only weak vertical flow, since the purified ground water is further discharged to the ground located much higher than the contaminated bottom region. The flowing out of the purified ground water along the shaft wall is prevented by a sealing pack 38 around the well pipe 13 in the region of the water-free chamber 19.

In the embodiment shown in FIG. 2, substantially the same cleaning arrangement is used as in FIG. 1. The same parts are identified with the same reference numerals with added primes. The cleaning arrangement includes a nozzle body 28' with an air chamber 29', an air or gas supply pipe 30', and a guiding ring 36' arranged concentrically relative to the supply pipe 30'. In deviation from FIG. 1, in the arrangement of FIG. 2 the water suction region 20' of the shaft is located above the resupply region 21' of the shaft. Both regions are sealed from one another by a partition 39 which is mounted on a pipe 40, without a water-free chamber.

A cup-shaped extension 41 of the pipe 40 accommodates the cleaning device with the nozzle body 28', the air receiving chamber 29', the cleaning region 33' and the guiding ring 36', as well as the suction pump 22', enclosed by an inner cup 42. The pump 22' is located in a lower region 43 of the inner cup 42, which is separated by a partition 44 from a water receiving chamber 26' located under the nozzle plate. The pump chamber 43 is connected through a pipe 45 with the suction region 20' of the shaft.

The negative pressure produced in the shaft 12' by a pump 116 arranged outside the shaft causes a lifting of the water level in the wall pipe outside the cup-shaped extension 41 to the level 34b. In the cup-shaped extension 41 the water level is further lifted to the level 34a' under the action of the pump 22'. The water flows from the suction region 20' through the pipe 45 into the pump chamber 43 and finally through a pipe piece 25' into the water receiving chamber 26'. From there, it is supplied through the water passage shaft 32' in the nozzle body 28' into the cleaning region 33'. By lifting of the water level 34a' and thereby pressure produced in this manner, a vertical flow of the purified water in the chamber between the walls of the inner cup 42 and the cup-shaped extension 41 from above downwardly is improved.

At the lower end of the cup-shaped extension 41, the purified ground water flows through the pipe 40 into resupply region of the shaft 21' and from there out of the ground region. A vertical flow of the water from below upwardly is produced in the ground, depending on the pressure difference in the well shaft between the resupply region 21' and the suction region 20'. This vertical flow in the ground is identified by the arrow 46. It prevents a spreading of the contaminants into the ground water region 11'. As a result, a water circulation between the well shaft and the ground in a clockwise direction is produced due to the arrangement of the suction region 20' above the resupply region 21'.

In addition to the pump 116 for producing the negative pressure in the shaft 12' and for supplying the air and/or cleaning gases through the supply pipe 30', additional filtering and spreading devices for the air and/or gas are provided above the earth surface in the arrangement of FIG. 2. After the pump 116 a first filter station 123 is arranged and performs a course cleaning of the waste air or waste gas. After passing the first filter stage 123, the cleaning gas controlled by an air throttle 125 is partially supplied back through a connection 126 into the gas supply pipe 30'. The other part of the cleaning gas passes a second cleaning stage 128 for fine filtering, before being supplied through a connection 129 also to the gas supply pipe 30'. An inlet opening 130 in the supply pipe 30' serves for the supply of fresh air or fresh cleaning gas through an air throttle 131.

Instead of the above shown two-stage filter device, naturally also multi-stage filter devices can be provided. At least one of the stages can also be provided with special devices, such as for example a cold reactor.

The pumps 22, 22', 23 and 116 are connected in the arrangements of FIGS. 1 and 2 with a not shown control unit and thereby their output can be controlled.

It will be understood that each of the elements described above, or two or more together, may also find a useful application in other types of constructions differing from the types described above.

While the invention has been illustrated and described as embodied in an arrangement for driving out of volatile impurities from a ground water, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for driving volatile impurities from ground water and ground through which it flows by producing a negative pressure in a well shaft extending to a region of a contaminated ground water, the arrangement comprising at least one partition separating a well shaft region with a water permeable shaft wall for water suction from the ground and a well shaft region with a water permeable shaft wall for resupply of the water into the ground; a nozzle body arranged in the well shaft and forming an air receiving chamber for receiving air under the action of negative pressure acting in the well shaft and then supplying the air into a cleaning region of the well shaft; means forming a closed water receiving chamber arranged underneath said nozzle body as to receive water from said water suction region and supplying the water to the cleaning region; and a suction pump arranged in said water suction region and having an outlet connected with said water receiving chamber.

2. An arrangement as defined in claim 1; and further comprising a connecting pipe for connecting said outlet of said suction pump with said water receiving chamber.

3. An arrangement as defined in claim 1; and further comprising a control unit located outside of the shaft and connected with said suction pump for regulating its output.

4. An arrangement as defined in claim 1, wherein the water suction region is located under the resupply region of the shaft.

5. An arrangement as defined in claim 1, wherein the water suction region is located above the resupply region of the shaft.

6. An arrangement as defined in claim 1; and further comprising a separating wall located between said water suction region and said resupply region; and sealing means enclosing said shaft wall in the region of said separating wall.

7. An arrangement as defined in claim 1; and further comprising a connecting conduit extending between the water suction region and resupply region and having a cup-shaped extension; and said water receiving chamber, said nozzle body and said cleaning region being arranged in said cup-shaped extension of said connecting conduit.

8. An arrangement as defined in claim 7, wherein said water suction region is located above said resupply region, said suction pump being also arranged in said cup-shaped extension of said connecting conduit.

9. An arrangement as defined in claim 1; and further comprising means for sucking a cleaning gas or gas mixture; and filtering means arranged after said sucking means, said filtering means including a gas supply pipe and at least one connection for said gas supply pipe for the cleaning gas or gas mixture for at least partial return of the gas into the well shaft.

10. An arrangement as defined in claim 9, wherein said filtering means are two-stage means including a first stage, a throttle flap, said connection to said gas supply pipe being located after said first stage and before said throttle flap.

11. An arrangement as defined in claim 10, wherein said first filter stage has means for a coarse filtering, said filtering means including at least one further stage with means for a fine filtering of aspirated cleaning gas and gas mixture.

12. An arrangement as defined in claim 11, wherein said further filter stage has a cold reactor for freezing contaminant substances.

13. An arrangement for driving volatile impurities from ground water and ground through which it flows by producing a negative pressure in a well shaft extending to a region of a contaminated ground water by supplying a gas in an air chamber arranged above a water level in the well shaft, the arrangement comprising a plurality of partitions separating a well shaft region with a water permeable shaft wall for water suction from the ground and a well shaft region with a water permeable shaft wall for resupply of the water into the ground, said plurality of partitions mounted on a connecting pipe; a suction pump arranged in the water suction region of the shaft and having an outlet; a nozzle body; a closed water receiving chamber arranged underneath said nozzle body, said outlet connected with said water receiving chamber by said connecting pipe, said partitions limiting therebetween a water free region, said water suction region being separated from said resupply region by said water free region.

14. An arrangement as defined in claim 13, wherein said connecting pipe extends between said water suction region and said resupply region through said water free region and through said partitions.

15. An arrangement as defined in claim 13; and further comprising sealing means enclosing said shaft wall in the region of said water free shaft region between said water suction region and said resupply region.

* * * * *